US007865601B2

(12) United States Patent
Yamamoto et al.

(10) Patent No.: US 7,865,601 B2
(45) Date of Patent: Jan. 4, 2011

(54) CONNECTION SETTING PROGRAM METHOD AND APPARATUS

(75) Inventors: Takao Yamamoto, Hamamatsu (JP); Yasushi Tamazawa, Hamamatsu (JP); Takaaki Muto, Hamakita (JP)

(73) Assignee: Yamaha Corporation, Hamamatsu-shi (JP)

( * ) Notice: Subject to any disclaimer, the term of this patent is extended or adjusted under 35 U.S.C. 154(b) by 1077 days.

(21) Appl. No.: 10/912,945

(22) Filed: Aug. 6, 2004

(65) Prior Publication Data
US 2005/0038922 A1 Feb. 17, 2005

(30) Foreign Application Priority Data
Aug. 13, 2003 (JP) ............... 2003-292701

(51) Int. Cl.
*G06F 15/16* (2006.01)
(52) U.S. Cl. .................. 709/227; 709/228; 709/237
(58) Field of Classification Search ......... 709/227–228, 709/220, 223, 237
See application file for complete search history.

(56) References Cited
U.S. PATENT DOCUMENTS

| 5,901,325 | A  | * | 5/1999  | Cox .................. 710/1 |
| 6,226,672 | B1 | * | 5/2001  | DeMartin et al. ........... 709/219 |
| 6,477,181 | B1 |   | 11/2002 | Fujimori et al. |
| 6,496,802 | B1 | * | 12/2002 | van Zoest et al. ............ 705/14 |
| 6,937,704 | B1 | * | 8/2005  | Meijer et al. ............. 379/88.18 |
| 2001/0021188 | A1 |   | 9/2001 | Fujimori et al. |
| 2002/0174198 | A1 | * | 11/2002 | Halter ..................... 709/220 |
| 2004/0236864 | A1 | * | 11/2004 | Stevenson et al. ........... 709/231 |

FOREIGN PATENT DOCUMENTS

| EP | 1 093 319    | 4/2001  |
| JP | 2001-339393  | 12/2001 |
| JP | 2001339404   | 12/2001 |
| WO | WO 99/59309  | 11/1999 |
| WO | WO-99/59309  | 11/1999 |
| WO | WO-01/50681  | 7/2001  |

OTHER PUBLICATIONS

Wiffen, Paul: mLAN's Promise: Audio & Midi Down the Same Wire, Keyboard Magazine, Feb. 2001, pp. 40-44.
The Facts About Firewire, Molex, Inc., Apr. 1997, pp. 20-25.
Consumer Audio/Video Equipment—Digital Interface, Part 1: General, IEC, second Edition, Jan. 2003.

* cited by examiner

*Primary Examiner*—William C Vaughn, Jr.
*Assistant Examiner*—Mohamed Ibrahim
(74) *Attorney, Agent, or Firm*—Morrison & Foerster LLP

(57) ABSTRACT

A plurality of devices connected to a network each includes at least either one or more output plugs for transmitting one or more data streams, or one or more input plugs for receiving one or more data streams, and each of the devices is capable of packeting a plurality of data streams and isochronously transferring the packet to another device in the network. Connection setting program, designed to set connection between a transmission source device and a transmission destination device in the network, includes a step of detecting a predetermined condition for performing automatic setting of logical connection, and a setting step of, in response to detection of the predetermined condition, automatically setting logical connection between the one or more input plugs and the one or more output plugs of the devices. Such arrangements facilitate setting of logical connection between the devices interconnected via the network.

9 Claims, 6 Drawing Sheets

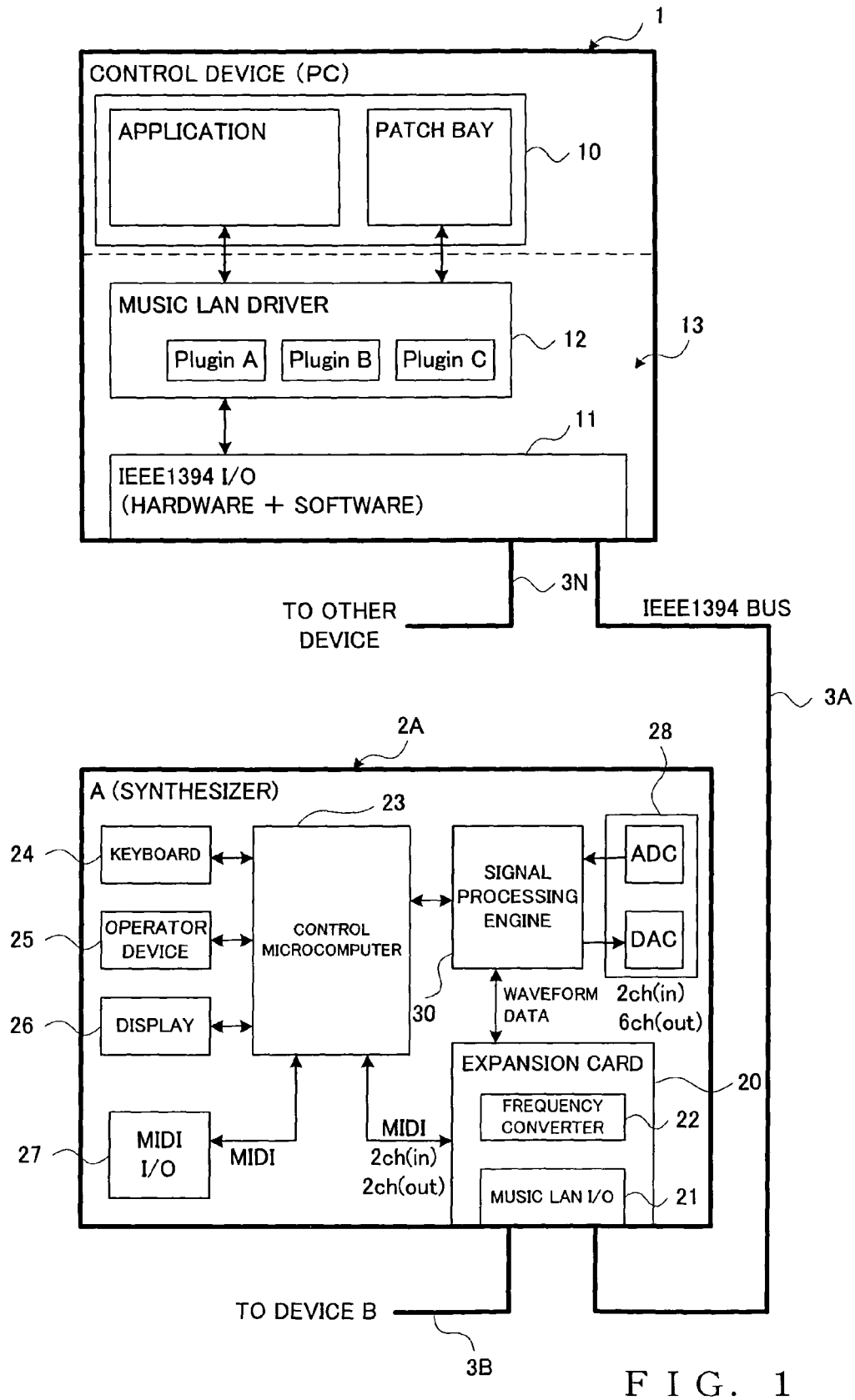
F I G. 1

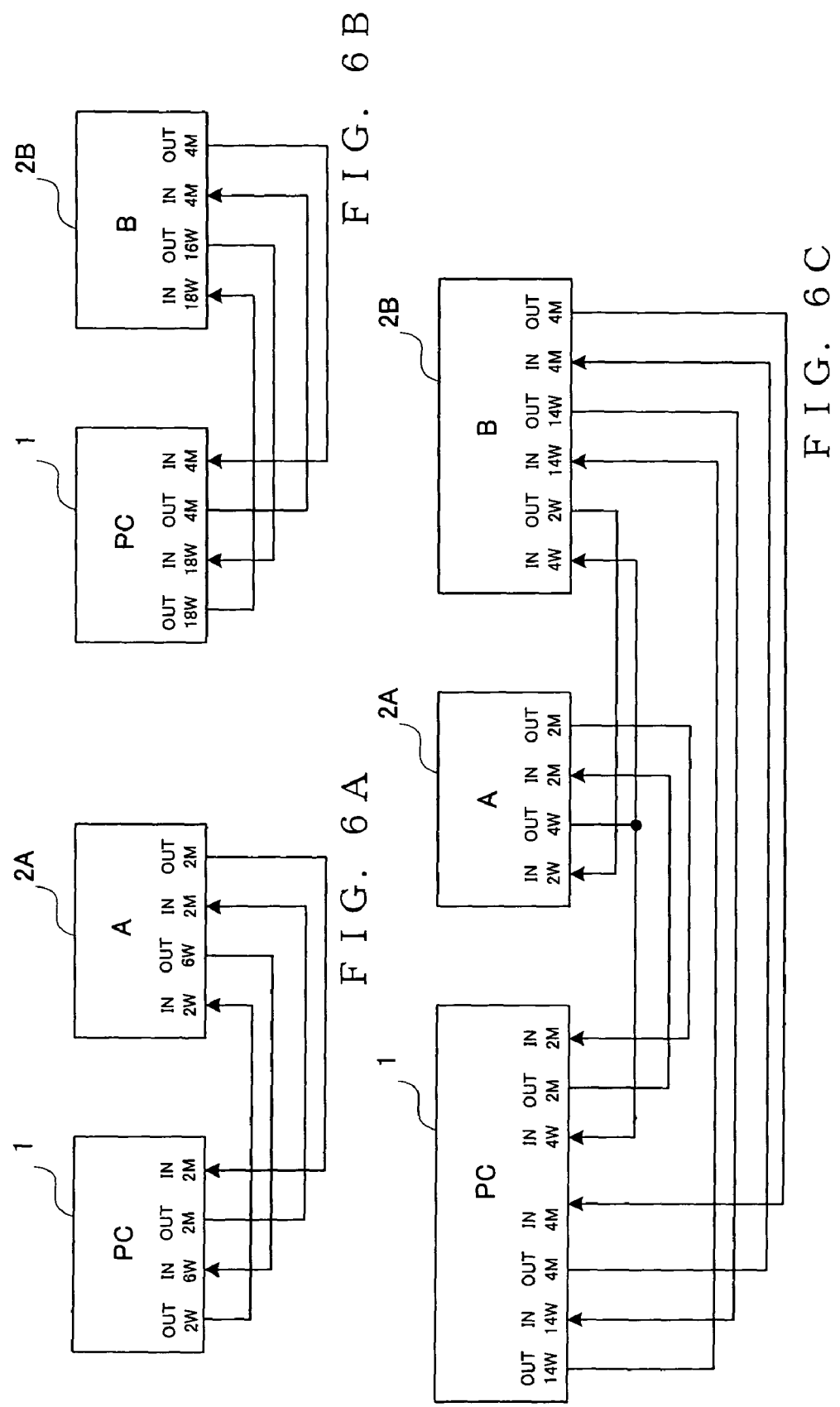

CONNECTION SETTING PROGRAM METHOD AND APPARATUS

BACKGROUND OF THE INVENTION

The present invention relates to connection setting programs, methods and apparatus for setting or establishing logical connection between a plurality of devices interconnected via a communication network, and more particularly to an improved connection setting program, method and apparatus that facilitate setting or establishment of logical connection between network-connected devices.

Music systems have been known which are arranged to communicate (transmit and receive) music data, such as waveform data (audio waveform sample data) and performance data (performance event data like MIDI data), in communication networks constructed in accordance with predetermined communication standards, such as the IEEE1394 standard. Among the music systems is a music system developed by the assignee of the instant application and called "mLAN" (trademark). In these music systems, a plurality of nodes, such as a control device (e.g., personal computer) and music devices (synthesizers, tone generators, recorders, mixers, etc.), are interconnected to provide the music system, and waveform data and MIDI data streams of a plurality of channels can be isochronously transferred from a given one of the nodes to two or more others of the nodes via a plurality of isochronous channels defined in accordance with the above-mentioned communication standard. Each of the nodes can increase the number of the channels of the waveform data stream, which is to be output therefrom, up to the number of waveform output plugs provided in the node, and it can also increase the number of the channels of the MIDI data stream, which is to be output therefrom, up to the number of MIDI output plugs provided in the node. Further, in the music system, each of the nodes can transmit to one or more of the isochronous channels, and waveform data and MIDI data streams of a plurality of channels can be transferred even via one such isochronous channel. Japanese Patent Application Laid-open Publication No. HEI-10-32606 corresponding to U.S. Pat. No. 6,477,181 discloses an invention concerning such a music system.

Further, devices for interconnecting, as desired, input/output lines of various music devices, such as keyboards, sequencers and mixers, are generally known as "patch bays". Japanese Patent Application Laid-open Publication No. 2001-203732 corresponding to US2003/0021188A1 discloses an invention concerning such a patch bay for logically setting a desired connection between devices (nodes) interconnected via a communication network as noted above. Music data are transmitted from a transmitting (i.e., output-side) node to a receiving node which have been appropriately set, via the patch bay, for logical connection.

With the above-discussed conventional systems, merely physically connecting the music device to the network can not establish logical connection between the music devices and thus can not achieve data communication to and from the music device. In order to permit data communication to and from the music device newly connected to the network, it is necessary for the user to establish logical connection of the music device by starting up an application program for the patch bay (i.e., patch bay program), as disclosed in the No. 2001-203732 publication, on a personal computer connected to the network. Such operation by the user tends to be very cumbersome and laborious. Besides, because merely physically connecting the music device to the network can not cause the music device to operate, a beginner or novice user of the patch bay program, who does not know that logical connection of the music device has to be set by the user himself or herself starting up the patch bay program, would often misjudge that something is wrong with the music device or communication network, which results in significant inconveniences.

SUMMARY OF THE INVENTION

In view of the foregoing, it is an object of the present invention to provide a connection setting program, method and apparatus that facilitate setting or establishment of logical connection between a plurality of devices interconnected via a communication network In order to accomplish the above-mentioned object, the present invention provides a connection setting program containing a group of instructions for causing a computer to perform processing for setting connection between a transmission source device and a transmission destination device in a music system, the music system comprising a plurality of devices connected to a network, each of the devices in the network being capable of organizing a plurality of data streams into a packet and isochronously transferring the packet to another device in the network, each of the plurality of devices including at least either one or more output plugs for transmitting one or more data streams, or one or more input plugs for receiving one or more data streams. The connection setting program of the present invention is characterized by comprising: a step of detecting a predetermined condition for performing automatic setting of logical connection; and a setting step of, in response to detection of the predetermined condition, automatically setting logical connection between the one or more input plugs and the one or more output plugs included respectively in the plurality of devices.

The above-mentioned predetermined condition is, for example, when software for connecting the device to the network is installed in any one of the plurality of devices, or when a bus reset has occurred in the network with no wire connection made between the devices, or when a new device has been connected to the network, or when network driver software for the music system has been started up in response to powering-on of a personal computer, or when a synchronized sampling frequency of waveform data (i.e., data quantity per predetermined unit time) in the music system has been switched to another frequency.

Namely, the present invention permits automatic setting of logical connection between the plurality of devices interconnected via the network. Thus, even where the user is a novice or beginner user, any necessary connection setting can be completed such that the music system can operate, without being noticed by the user (i.e., transparently to the user). As a result, the present invention advantageously allows even the novice user to smoothly use the system without causing substantial embarrassment to the user.

The present invention may be constructed and implemented not only as the program executable by a processor, such as a computer or DSP, as discussed above, but also as a storage medium storing such a program and as method and apparatus inventions. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 1 is a block diagram conceptually showing an example of a fundamental setup of a music system to which is applied a connection setting apparatus and program in accordance with an embodiment of the present invention;

FIGS. 6A to 6C are conceptual diagrams showing several examples of automatic connection setting styles.

DETAILED DESCRIPTION OF EMBODIMENTS

Figure 2:
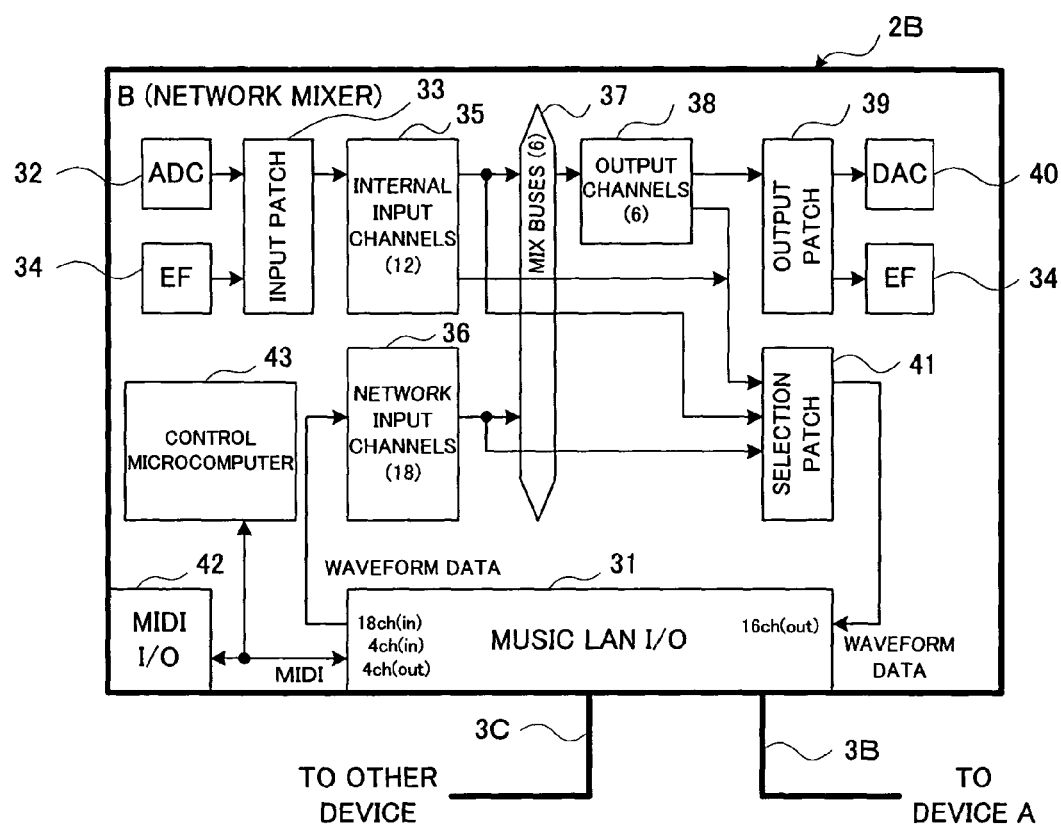
FIG. 2 is a block diagram showing an example setup of a music device additionally connected to a network of the music system shown in FIG. 1.

FIG. 1 is a block diagram conceptually showing an example of a fundamental setup of a music system to which is applied a connection setting apparatus and program in accordance with an embodiment of the present invention. This music system comprises a plurality of nodes interconnected via a communication network constructed in accordance with a predetermined communication standard, such as the IEEE1394 standard; alternatively, the communication standard may be the USB standard or the like. In FIG. 1, a control device 1 and a music device 2A are interconnected, as basic examples of the nodes, via a bus 3A compliant with the predetermined communication standard. Also, the music device 2A is connectable with another music device 2B via a similar bus 3B, as illustrated in FIG. 2, and the control device 1 is connectable with another device via a similar bus 3N. The music device 2B is connectable with still another music device (not shown) via a similar bus 3C, and so on. By thus interconnecting a plurality of nodes (devices) successively in a chain-like manner, there can be provided a network based on a chain connection or multipoint connection scheme. Music data of a plurality of channels can be transferred in packets between the nodes, in accordance with the predetermined communication standard; namely, music data, such as performance data including waveform data (e.g., audio waveform sample data) and performance event data (e.g., MIDI data), can be communicated between the nodes in the network. The connection scheme for the network may be other than the chain connection or multipoint connection scheme as illustrated in the figures, such as one for interconnecting the nodes via a hub device. Further, the connection scheme may be of a wireless type rather than a wired type.

Typically, the control device 1 is implemented by a personal computer (hereinafter also referred to as "PC"). The PC 1 is equipped with a music LAN interface section 13 that complies with the IEEE1394 standard and other communication standard, such as the mLAN standard that is a music data communication standard proposed by the assignee of the instant application. Specifically, the music LAN interface section 13 includes an IEEE1394-standard interface (I/F) 11 as a lower-layer interface, and a music LAN driver 12 for controlling communication of music data as an upper-layer interface by use of the IEEE1394-standard interface 11. More specifically, the IEEE1394-standard interface 11 is an interface composed of hardware and software for performing data communication in accordance with the IEEE1394 standard, and it performs actual data transmission/reception to/from the network. As well known, according to the IEEE1394 standard, data packet communication is performed via isochronous and asynchronous transfers per predetermined transfer cycle period (e.g., 125 µs). For example, music data or other data of which strict realtimeness is required are transferred by the isochronous transfer, while connection setting information for transmitting and receiving nodes, such as a patch bay, or other data of which strict realtimeness is not required are transferred by the asynchronous transfer. However, in the instant embodiment, the data transferred isochronously via the IEEE1394-standard interface are not limited to music data as noted above; video and other data are also be transferred isochronously. Because the upper-layer music LAN driver 12 is a driver implemented by software for performing communication (transmission/reception) control on the music data in the IEEE1394-standard interface 11, the video and other data are not among objects of control by the music LAN driver 12.

Further, within a block of the PC 1 in FIG. 1, an example configuration of the software executed in the PC 1 is depicted in a hierarchical manner, which shows that upper layers control lower layers and that the lower layers perform operations based on control by the upper layers. As shown, various application programs 10 are provided as components higher in level than the music LAN interface section 13, and the application programs 10 instruct the music LAN interface section 13 to perform data communication processing. Among the application programs 10 is a patch bay program for setting connection between a plurality of nodes and setting data communication between the nodes having been thus set for connection. Further, in order for the control device (PC) 1 to manage communication per music device connected via the network to the music system, the music LAN driver 12 of the music LAN interface section 13 installs plugin software for each of the music devices to be connected and can communicate with the music devices corresponding to the installed plugin software. In the illustrated example, plugin software (plugin A, plugin B and plugin C) for three music devices are installed in the music LAN driver 12. In the instant embodiment, the connection setting program is included in the patch bay program for execution by the PC 1.

Examples of the music devices connected to the network may include electronic musical instruments like music synthesizers, automatic performance devices like sequencers, waveform recording devices, signal processing devices like mixers and effectors, tone generators and any other types of music-related devices. In the illustrated example, the music device 2A is assumed to be an electronic musical instrument like a music synthesizer; in the illustrated example of FIG. 2, the music device 2B is assumed to be a mixer.

The music device (synthesizer) 2A shown in FIG. 1 includes a control section 23 for performing overall control of the music device 2A. To the control device 23 are connected a music LAN expansion card 20, a signal processing engine 30, a keyboard 24 as an performance operator unit, an operator device 25 for making various settings, a display device 26, etc. The signal processing engine 30 performs predetermined signal processing in accordance with a predetermined sampling frequency, and it performs waveform data generation processing (tone generation processing) in the synthesizer.

The music LAN expansion card 20 is an interface card complying with a predetermined communication standard, such as the IEEE1394 standard or mLAN standard proposed by the assignee of the instant application. The music LAN expansion card 20 generally comprises a music LAN interface (hereinafter "music LAN I/O") 21, and a sampling frequency (Fs) converter. The music LAN interface 21 includes hardware and software for performing a data transmission/reception function in accordance with the IEEE1394 or mLAN standard. The sampling frequency (Fs) converter 22 is provided for appropriately converting a sampling frequency of waveform data communicated between the music LAN I/O 21 and the signal processing engine 30.

The music device 2A further includes a MIDI input/output interface (MIDI I/O) 27 for inputting/outputting performance data of the MIDI format, and a waveform input/output interface (waveform I/O) 28 for inputting/outputting analog or digital waveform data. The waveform input/output interface 28 includes an analog-to-digital converter (hereinafter referred to as an "ADC"), digital-to-analog converter (hereinafter referred to as a "DAC"), buffer memory, etc., and it inputs or outputs digital or analog waveform data from or to the signal processing engine 30 on a real-time basis. Although not specifically shown, the waveform input/output interface 28 is connected to a pickup microphone, audio-producing sound system and other waveform data input/output device. The MIDI I/O interface 27 inputs or outputs performance data of the MIDI format from or to the control section 23 on a real-time or non-real-time basis, and it is connected to a MIDI input/output device (not shown), such as a MIDI musical instrument or sequencer.

The music LAN I/O 21, which is provided on the expansion card 20, communicates music data (including waveform data and MIDI data) compliant with the mLAN standard via the network, and it has, as its lower-level structure, a function for transmitting/receiving data of the IEEE1394 standard. The music LAN I/O 21 includes a buffer memory, such as an FIFO, for buffering music data to be transmitted to or received from the network (buses 3A and 3B), timer, means for generating, on the basis of outputs from the timer, word clock pulses to be used for synchronizing each node to a common sampling frequency in order to permit music data communication in the network, etc.

As an example, the music LAN I/O 21 provided on the expansion card 20 of the music device 2A includes two waveform input plugs for inputting waveform data of two channels from the network, six waveform output plugs for outputting waveform data of six channels to the network, two MIDI input plugs for inputting MIDI performance data of two channels from the network, and two MIDI output plugs for outputting MIDI performance data of two channels to the network.

The music device (mixer) 2B not only performs mixing setting and processing by itself, but also has a function of performing mixing setting and processing using the control of the PC 1 in the network. The music device 2B includes a music LAN I/O 31 similar to the above-mentioned and communicates music data (waveform data and MIDI performance data) compliant with the mLAN standard via the network (buses 3B and 3C). Input audio signals (waveform data) of a plurality of channels, externally input via an ADC 32 are distributed to any desired ones of a total of 12 internal input channels 35 via an input patch section 32. The music LAN I/O 31 includes 18 waveform input plugs for receiving audio signals (waveform data) of 18 channels from one or more desired nodes in the network, and these signals are allocated to a total of 18 network input channels 36 corresponding to the waveform input plugs. Respective signals of the input channels 35 and 36 are input to given one or more of six digital mixing buses 37 in accordance with respective settings of the channels. Each of the six missing buses 37 mixes together the respective input signals and outputs the resultant mixed signals to the corresponding output channels 38. Output patch section 39 distributes the output signals from the output channels 38 and signals directly given from the internal input channels 35 to any desired inputs of a plurality of DACs 40 and one or more internal effecters 34.

Further, the music LAN I/O 31 includes 16 waveform output plugs for outputting input waveform data of 16 channels to one or more given nodes in the network. Selection patch 41 distributes output signals from the output channels 38, internal input channels 35 and network input channels 36 to given ones of 16 input channels of the music LAN I/O 31 that receive waveform data to be output to the network. Setting of various mixing parameters and assignment of the various patch sections can be made either through operation of predetermined operators provided on the music device (mixer) 2B itself or through remote operation by the PC 1 in the network via the music LAN I/O 31.

MIDI I/O 42 is an interface for inputting or outputting MIDI data from or to outside the music device, and the input MIDI data are delivered to a control microcomputer 43. The control microcomputer 43 is provided for remote-controlling the mixing operations of the music device 2B in accordance with MIDI data input from the outside. MIDI data of four channels can be input from any desired node in the network via the music LAN I/O 31. Also, MIDI data of four channels can be output to any desired node in the network. MIDI data input/output ports of the music LAN I/O 31 are connected to the control microcomputer 43 and MIDI I/O 42.

Connection between the individual nodes in the music system can be set or established by executing the patch bay program of the PC 1. With the patch bay program logically connecting a plurality of the nodes connected to the network, each of the nodes can be set as a data transmitting device or data receiving device on a channel-by-channel basis.

Figure 3A:
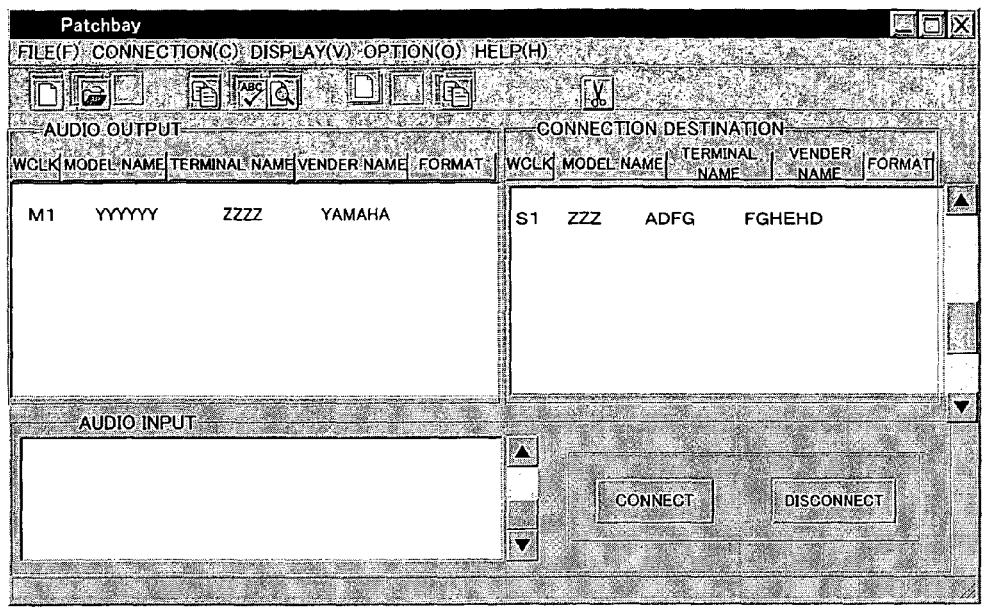
FIGS. 3A and 3B are diagrams showing examples of connection setting screens in the embodiment.

With the patch bay program, states of connection between the nodes in the network, etc. can be visually displayed on a display screen of the PC 1, and the user can perform desired connection setting operation with reference to the display screen. FIG. 3 shows examples of the display screen. More specifically, FIG. 3A shows an example of an "audio page list menu screen" listing connection states related to waveform data. On an "audio output" section of the menu screen, there is displayed a listing of information about respective waveform output plugs of all the network-connected nodes for transmitting waveform data to the network. On an "audio input" section of the menu screen, there is displayed a listing of information about not-yet-connected (i.e., unpatched) waveform input plugs among the waveform input plugs of all the nodes for receiving waveform data from the network. Of the displayed waveform output/input plug information, "WCLK" indicates which of the word clocks WC operation of the node in question is based on, "Model Name" indicates the name of the device comprising that node, and "Terminal Name" indicates the name given by the user to the waveform output/input plug. "Vender Name" indicates the name of the vender of the device comprising that node, and "Format" indicates the format of the waveform data to be output/input via the waveform output/input plug. For example, information about one waveform output plug of a given waveform data transmitting device (transmitting node) is selected on the audio output section of the screen through operation of a mouse or the like, and information about one or more waveform input plugs of one or more given devices (receiving nodes) is selected on the audio input section of the screen through operation of the mouse or the like. Then, by turning on a "Connect" button on the screen to confirm the selection, the display of the selected waveform input plug information is switched from the audio input section over to a "connection destination" section. Information about respective one or more waveform output plugs of a plurality of nodes can be displayed in vertically-arranged horizontal rows on the "audio output" section, and information about one or more waveform input plugs connected to the one or more waveform output plugs can be displayed in vertically-arranged horizontal rows on the "connection destination" section. In this way, it is possible to readily ascertain, intuitively through the visual sense, from which of the devices and to which of the devices the waveform data are to be transferred.

Figure 3B:
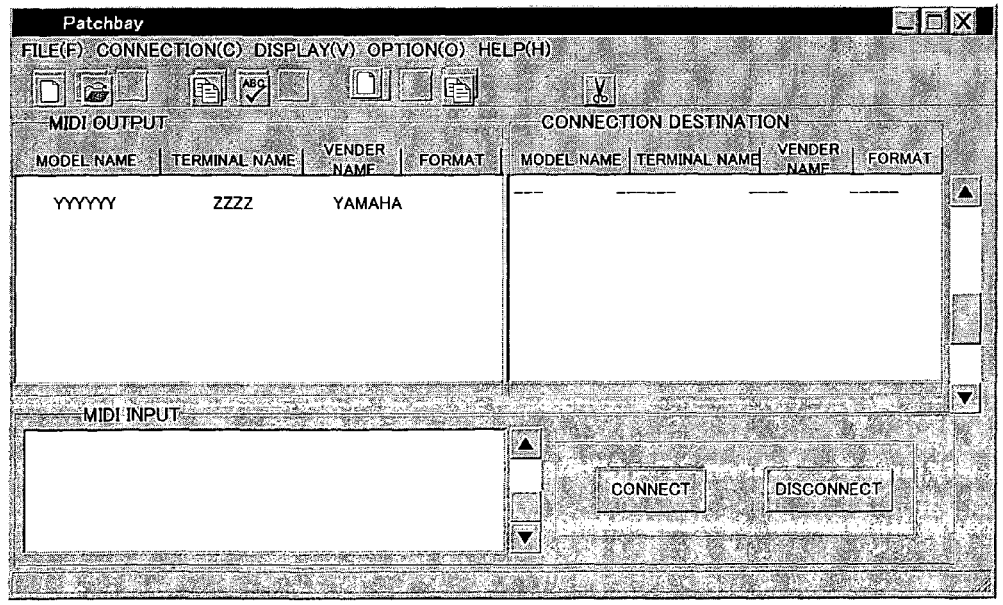

FIG. 3B shows an example of a "MIDI page list menu screen" listing connection states related to MIDI data. Similarly to the audio page list menu screen, there is displayed, on a "MIDI output" section of the screen, a listing of information about respective MIDI output plugs of all the nodes for transmitting MIDI data. On a "MIDI input section", there is displayed a listing of information about MIDI input plugs for receiving MIDI data. On a "connection destination" section, there is displayed information about a MIDI input plug connected to a given MIDI output plug. In the illustrated example, "-", indicating "there is no MIDI input plug connected", is displayed on the connection destination section; that is, the mark "-" indicates that no MIDI input plug has been connected yet to the given MIDI output plug.

The instant embodiment allows logical connection to be automatically set between any nodes in the network under a predetermined condition, without relying on connection setting operation by a human operator as noted above; namely, the instant embodiment can perform automatic connection setting processing under the predetermined condition. One typical example of the predetermined condition for executing the automatic connection setting processing is when plugin software is installed for newly connecting a given music device to the network and allowing the given music device to operate as a node in the network. Example operational sequences of the automatic connection setting processing will be explained below with reference to FIGS. 4 and 5.

Figure 4:
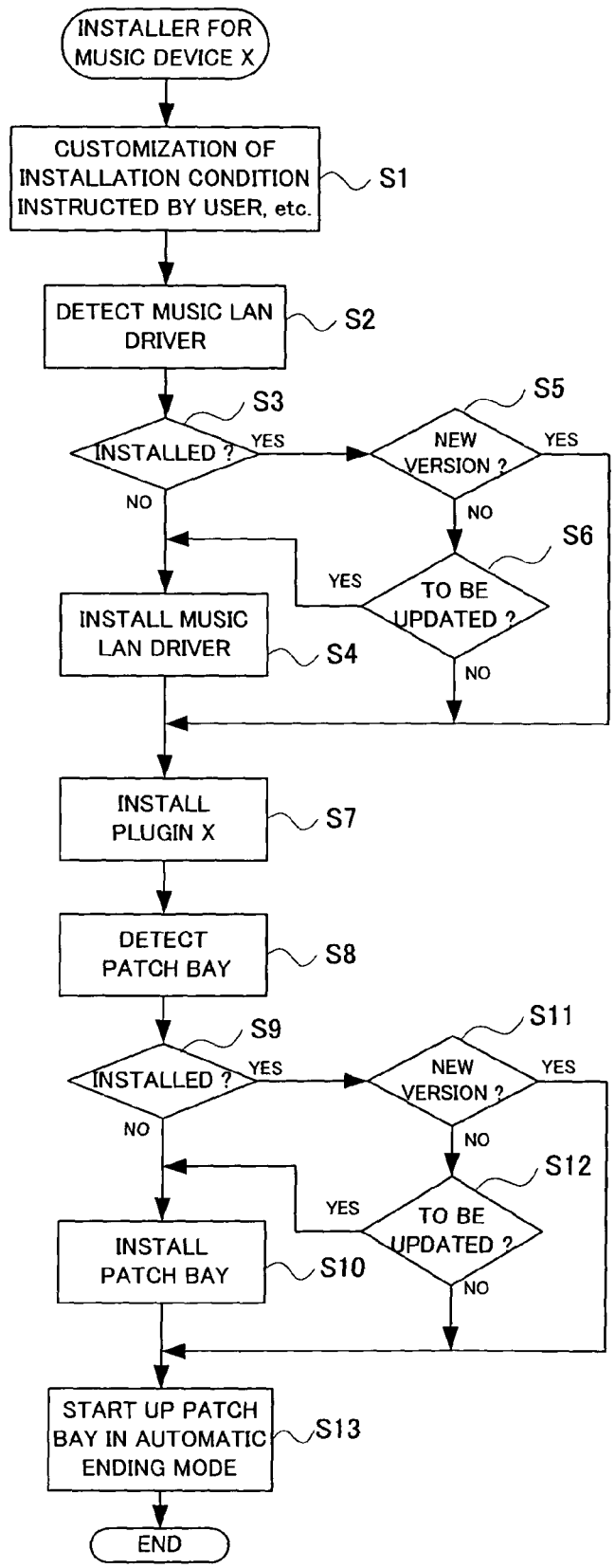
FIG. 4 is a flow chart showing an example sequence of operations performed when a given music device is installed.

FIG. 4 is a flow chart showing an example operational sequence of a music device installer that is executed by the PC 1 when a given music device X is to be newly connected to the network for installation in the music system. After an installation condition for the music device X is customized as instructed by the user at step S1, a driver detection operation is performed at next step S2 to detect whether the music LAN driver 12 (FIG. 1), i.e. fundamental software for achieving the communication function of the music system, has already been installed. If the music LAN driver 12 has not been installed yet as determined at step S3, then the driver 12 is installed at step S4. If the music LAN driver 12 has already been installed (YES determination at step S3), an inquiry is made with the user of the patch bay program (i.e., user of the PC 1) as to whether or not the installed driver 12 is to be updated, in case the installed driver 12 is of an old version. If the music LAN driver 12 is to be updated as determined at step S6, the PC 1 goes to step S4 to install a new version of the music LAN driver 12. Then, plugin software PluginX for the music device X is installed at step S7.

At following step S8, an application installation operation is performed to detect whether patch bay application software (patch bay program) has already been installed in the PC 1. If the patch bay application software has not been installed yet as determined at step S9, then the application software is installed at step S10. If the application software has already been installed (YES determination at step S9), an inquiry is made with the user as to whether or not the installed application software is to be updated, in case the installed application software is of an old version. If the application software is to be updated as determined at step S12, the PC 1 goes to step S10 to install a new version of the application software.

Finally, the patch bay application software is started up in an "automatic ending mode", at step S13. By thus instructing startup of the patch bay in the "automatic ending mode", it is indicated that the predetermined condition for initiating execution of the automatic connection setting processing has been satisfied.

Figure 5:
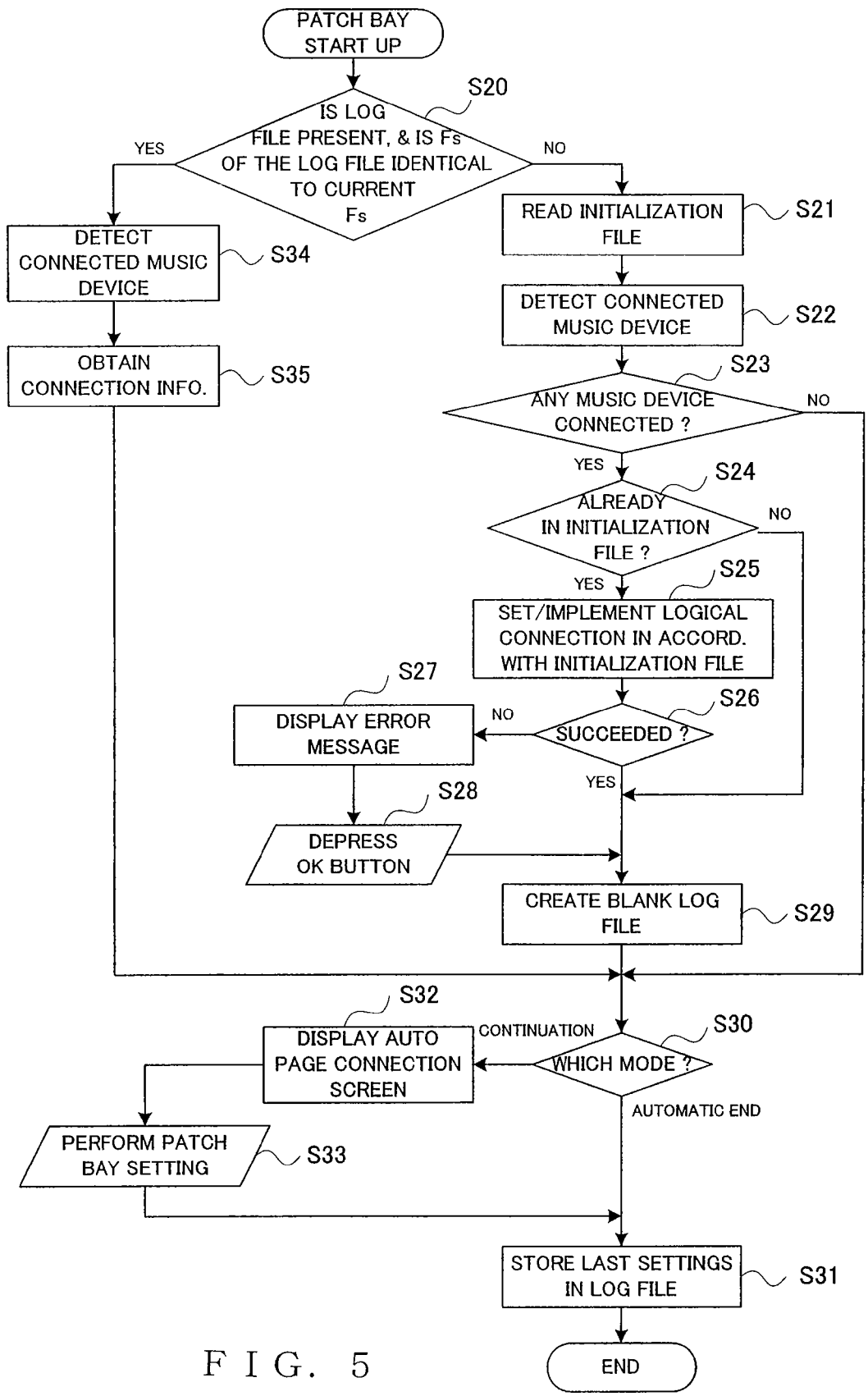
FIG. 5 is a flow chart showing an example sequence of operations performed when patch bay application has been started up.

FIG. 5 is a flow chart showing an example operational sequence that is executed by the PC 1 once the patch bay application software has been started up. The patch bay can be started up in any one of two ways: in the "automatic ending mode" in response to an automatic instruction from the installer at the time of the installation of the music device as set forth above; and in response to manual operation by the user. In the case where the patch bay is started up in the "automatic ending mode" in response to an automatic instruction from the installer, the patch bay screens as illustrated in FIG. 3 are not displayed at all, so that the processing of FIG. 5 is carried out in a form not viewed or noticed by the user, i.e. transparently to the user. On the other hand, in the case where the patch bay is started up in response to manual operation by the user, the patch bay screens as illustrated in FIG. 3 are displayed through predetermined procedures.

First, at step S20, it is determined whether a log file of the patch bay is present in a memory within the PC 1, and, if present, it is further determined whether the last sampling frequency Fs recorded in the log file is identical to a currently-selected sampling frequency Fs. The log file of the patch bay is a file created when the patch bay was used to set logical connection between the devices in the network. If no such log file is present, or if the last sampling frequency Fs recorded in the log file is different from the currently-selected sampling frequency Fs (NO determination at step S20), the automatic connection setting processing is carried out in the following manner. In the case where there is present a log file of the patch bay in the memory within the PC 1 and the last sampling frequency Fs recorded in the log file is identical to the currently-selected sampling frequency Fs (YES determination at step S20), then the automatic connection setting processing is not performed.

At step S21, a predetermined initialization file is read, which is a file prestoring respective predetermined automatic connection setting styles for various types of music devices connectable to the network. According to a typical example of the automatic connection setting styles, all (or as many as possible) of the waveform input/output plugs and MIDI input/output plugs possessed by (or provided in) the music LAN I/O 21, 31 of the music device (FIG. 1 or 2) are connected to the waveform input/output plugs and MIDI input/output plugs of the PC 1 or other node. Note that, in the PC 1, operations corresponding to those performed by the music LAN I/O are performed by the music LAN driver 12, and thus the number of the waveform input/output plugs and MIDI input/output plugs can be increased or decreased as necessary instead of being fixed. To facilitate understanding, several examples of the automatic connection setting styles are conceptually shown in FIG. 6.

FIG. 6A shows an automatic connection setting style where one synthesizer-type music device 2A as illustrated in FIG. 1 is connected to the PC 1; such a type of the device is represented by "A". Namely, in the case where only the PC 1 and synthesizer-type music device 2A are connected to the network, two waveform input plugs for two channels (IN2W), six waveform output plugs for six channels (OUT6W), two MIDI input plugs for two channels (IN2M) and two MIDI output plugs for two channels (OUT2M) of the music device 2A can be set for automatic connection to the waveform output/input plugs (OUT2W/IN6W) and MIDI output/input plugs (OUT2M/IN2M) that are provided, via the music LAN driver 12, in the PC 1 in corresponding relation to the above-mentioned plugs of the music device 2A. Note that, in a packet data transfer via the network, data of a plurality of channels can be included in a packet to be sent by each node. Thus, with this automatic connection setting style, at least a packet generated from the PC 1 (and including waveform data of two channels and MIDI data of two channels) and a packet generated from the music device 2A (and including waveform data of six channels and MIDI data of two channels) can be transferred during each isochronous cycle period.

FIG. 6B shows an automatic connection setting style where one mixer-type music device 2B as illustrated in FIG. 2 is connected to the PC 1; such a type of the device is represented by "B". Namely, in the case where only the PC 1 and mixer-type music device 2B are connected to the network, 16 waveform input plugs for 16 channels (IN16W), 18 waveform output plugs for 18 channels (OUT18W), four MIDI input plugs for four channels (IN4M) and four MIDI output plugs for four channels (OUT4M) of the music device 2B can be set for automatic connection to the waveform output/input plugs (OUT16W/IN18W) and MIDI output/input plugs (OUT4M/IN4M) that are provided, via the music LAN driver 12, in the PC 1 in corresponding relation to the above-mentioned plugs of the music device 2B.

Further, FIG. 6C shows an automatic connection setting style where the two types of music devices, i.e. synthesizer-type and mixer-type music devices 2A and 2B as illustrated in FIGS. 1 and 2, are connected to the PC 1. In this case, an appropriate connection style may be automatically set such that the input/output waveform data and input/output MIDI data of individual channels of one of the music device 2A are distributed to a plurality of other nodes (i.e., PC 1 and music device 2B), and the input/output waveform data and input/output MIDI data of individual channels of the other music device 2B are distributed to a plurality of other nodes (i.e., PC 1 and music device 2A). In the illustrated example, the waveform input plugs for four channel (IN4W) among the 18-channel waveform input plugs of the music device 2B are connected to the waveform output plugs (OUT4W) of the music device 2A, and the waveform input plugs for the remaining 14 channels (IN14W) of the music device 2B are connected to the waveform output plugs (OUT14W) provided in the PC 1. Also, the waveform output plugs for four channels (OUT4W) of the music device 2A are connected to the waveform input plugs (IN4W) of the PC 1. Further, the waveform input plugs for two channels (IN2W) of the music device 2A are connected to the waveform output plugs (OUT2W) of the music device 2B. Furthermore, the PC 1 may have additional waveform input plugs for two channels, to which the waveform output plugs (OUT2W) of the music device 2B may be connected. Other connections are also automatically set as shown in the figure. Note that the connection styles shown in FIG. 6 are just exemplary, and other predetermined connection styles may be used as appropriate such that as many as possible of the waveform and MIDI input/output plugs of the music devices to be connected are utilized efficiently so that the number of the plugs left unused is minimized.

Referring back to FIG. 5, a detection operation is performed at step S22 to detect what types of music devices are connected to the network, by the PC 1 making inquiries to all of the connected music devices and thereby acquiring information about the network-connected music devices (i.e., device information). Generally, the numbers of the waveform and MIDI input/output plugs of each of the devices can be identified on the basis of the type of the device; thus, the device information only has to include at least device type information indicative of the type of the music device. Therefore, the device information may include information indicative of the numbers of the waveform and MIDI input/output plugs provided in the music device, instead of the device type information. Note that, in the case of a music device of which numbers of the waveform and MIDI input/output plugs are unidentifiable, for example, due to the reason that more input/output plugs can be added as necessary, the device information should necessarily include information indicative of the numbers of the waveform and MIDI input/output plugs provided in the music device.

If it is determined, on the basis of the detection operation at step S22, that one or music devices are currently connected to the network (YES determination at step S23), a further determination is made at step S24 as to whether or not the detected music devices are ones for which automatic connection setting styles are already stored in the above-mentioned initialization file. With a YES determination at step S24, logical connection is automatically set and actually implemented at step S25 between the waveform or MIDI input/output plugs of the devices (nodes) in the network in accordance with data of the initialization file corresponding to a combination of the devices existing in the network, with a state where no logical connection has been made at all being considered an initial state. Let it be assumed that, if a plurality of music devices have been detected at step S22 and if an automatic connection setting style is stored in the initialization file only for given ones of the detected music devices (or only for a combination of some of the detected music devices), logical connection is automatically set and actually implemented between the waveform and MIDI input/output plugs of the given devices (or combination of the devices) on the basis of the stored automatic connection setting style. The automatic setting of the logical connection is implemented, for example, by the PC 1) informing the music LAN I/O of each of the devices (nodes) about respective data of isochronous channels via which the waveform or MIDI output plugs of the device should output waveform or MIDI data and isochronous channels via which the waveform or MIDI input plugs of the device should receive waveform or MIDI data and 2) storing the data. Namely, in accordance with the stored connection setting information, each of the devices (nodes) outputs data from the output plugs, as a packet, to the informed or designated isochronous channels and determines and inputs, to the input plugs, data from a packet transferred to the informed or designated isochronous channels. Then, the PC 1 receives connection setting conformation information, returned from each of the network-connected devices (nodes) in response to the execution of the automatic connection setting processing, and ascertains at step S26 whether or not the automatic connection setting has succeeded. If the automatic connection setting has failed as determined at step S26, a predetermined error message is displayed on a display at step S27, and confirmation operation, such as depression of an OK button, by the user is accepted at step S28. If the automatic connection setting has succeeded (YES determination at step S26), a log file, storing only settings made by the automatic connection setting, is newly created, but, if the automatic connection setting has failed, a blank log file is created after the acceptance of the confirmation operation by the user, at step S29. If only one or more music devices of given types, other than those types for which automatic connection setting styles are stored in the initialization file, are currently connected to the network, i.e. even with a NO determination at step S24, a blank log file is created at step S29. If no music device is currently connected to the network (NO determination at step S23), step S29 is skipped so that no blank log file is created. Thus creating no blank file will cause the automatic connection setting processing (steps S21-S29) to be performed again, in response to a NO determination at step S20, when any music device is later connected to the network.

At step S30, a determination is made as to whether or not the current patch bay processing has been started up in the "automatic ending mode". If the current patch bay processing has been started up in the "automatic ending mode" through step S13 of FIG. 4, a jump is made to step S31. Otherwise, i.e., if the batch bay processing of FIG. 5 has been started up in response to manual operation by the user (i.e., in a "continuation mode"), a predetermined patch bay connection screen, such as the audio page list menu screen of FIG. 3A, is displayed at step S32. With the display of the patch bay connection screen, a patch bay setting process responsive to user's operation can be carried out, at step S33. Through the patch bay setting process responsive to the user's operation, logical connection between the music devices (nodes) in the network is set and actually implemented. Once the user performs ending operation to close the patch bay window of FIG. 3 in order to terminate the patch bay setting process, the processing moves on to step S31. At step S31, if the settings stored in the log file and the last settings at that time point are different from each other, then the last settings are stored into the log file. After that, the patch bay program is brought to an end. For example, if the patch bay has been started up in the "automatic ending mode" and automatic connection setting has been performed in accordance with the initialization file through the automatic connection setting processing (steps S21-S29), it means that the automatic connection settings have already been stored in the log file at step S29 and no patch bay setting process is performed subsequently, so that the processing is brought to an end without performing any operation at step S31.

If the log file is already present when the patch bay has been started up in the "automatic ending mode", a YES determination is made at step S20, so that the processing goes to step S34 without performing the operations of steps S21-S29. At step S34, connection information stored in the log file is obtained, which is indicative of logical connection between the devices (nodes). After that, it is determined at step S30 that the current patch bay processing has been started up in the "automatic ending mode", and the patch bay is brought to an end by way of step S31. Namely, even when the patch bay has been started up in the "automatic ending mode", the previous connection setting by the user is given a priority and the automatic connection setting processing is not performed as being likely to become superfluous, unnecessary processing, because the presence of the previous log file means that the user of the PC 1 has ever used this patch bay.

The following paragraphs further describe operations to be performed when the patch bay processing of FIG. 5 has been started up in response to manual operation by the user (i.e., in the "continuation mode".

If the patch bay processing has ever been started up in the "continuation mode" with no music device connected to the network (NO determination at step S23), step S29 is skipped so that no blank log file is created. Then, once the patch bay processing of FIG. 5 is started up in response to manual operation by the user after one or more music devices are connected to the network, a NO determination is made at step S20 due to absence of the log file, so that the automatic connection setting processing (steps S21-S29) is performed again. In this way, automatic connection setting that corresponds to the network-connected devices is performed with reference to the initialization file. After creation of a blank log file at step S29, it is determined at step S30 that the current patch bay processing has been started up in the "continuation mode", and thus a desired patch bay setting process can be performed at steps S32 and S33 in response to operation by the user. Therefore, even a beginner or novice user can have a desired patch bay setting process performed while ascertaining the automatic connection settings on the display screen, and thus the patch bay can be used with utmost ease even by a novice user.

In the illustrated example of FIG. 5, the automatic connection setting processing is not performed again at steps S21-S29 even if one or more music devices corresponding to the recorded information in the initialization file are subsequently connected to the network, because a blank log file has been created at step S29 in response to a NO determination at step S24. However, the present invention is not so limited; for example, when a NO determination has been made at step S24, the processing may jump over step S29 to step S30. In such an alternative, the automatic connection setting processing can be performed again at steps S21-S29 when the patch bay processing of FIG. 5 is started up in response to manual operation by the user after one or more music devices corresponding to the initialization file are connected to the network, in a similar manner to the above-described.

The preferred embodiment has been described above in relation to the case where the patch bay processing of FIG. 5 is started up in the "automatic ending mode" in response to installation of a music device. However, the present invention is not so limited; for example, the patch bay processing of FIG. 5 may be started up in the "automatic ending mode", for example, when a bus reset has occurred in the network, when it has been detected that any music device is newly connected to the network, or when device-connecting driver software is started up in response to powering-on.

Further, whereas the preferred embodiment has been described above in relation to the case where the present invention is applied as a connection setting apparatus for connecting music devices to a network to thereby provide a music system, the devices (nodes) to be connected to the network are not limited to music devices and may be other suitable types of devices, such as video devices.

Furthermore, whereas the software programs related to the connection setting apparatus have been described as executed by a control-dedicated node (PC) in the network, the present invention is not so limited; for example, the automatic connection setting processing as described above may be performed by a control computer provided within any one of the nodes (e.g., music devices) which has a particular function.

Moreover, whereas the preferred embodiment has been described above as automatically setting logical connection upon detection that a predetermined condition has been met, the automatic connection setting may also be performed at any desired timing designated by the user. For example, an "Automatic Connect" button may be displayed on any of the screens of FIGS. 3A and 3B so that the automatic connection setting is performed in response to activation of the "Automatic Connect" button. Namely, the user is allowed to use the automatic connection setting based on the initial file, as if the automatic connection setting were preset connection setting.

As example specific operations for the automatic connection setting to be performed in such a case, a jump may be made from step S33 to step S21 of FIG. 5 with the display screen in question temporarily closed. Also, at step S29, automatically-set connection settings may be recorded in the already-present log file following settings so far made, instead of a new log file being set. In this way, it can be seen that the automatic connection setting has been performed in accordance with an user's instruction, and records of the previous settings can be preserved.

What is claimed is:

1. A non-transitory computer readable storage medium storing a connection setting program for causing a computer to perform a method for setting logical connection between the computer and a device in a music system, said music system comprising the computer and one or more devices that are all connected to a network, each of the computer and said one or more devices in said network being capable of organizing a plurality of wave data streams into a packet and isochronously transferring the packet to another device or the computer in said network, each of said one or more devices including at least either one or more output plugs for transmitting one or more wave data streams, or one or more input plugs for receiving one or more wave data streams, the input plugs or output plugs being different in number between the devices, said method comprising:

a step of reading, from a memory, a plurality of automatic connection setting styles in advance of the computer executing the connection setting program;

a step of detecting a predetermined condition for performing automatic setting of logical connection;

a step of, in response to detection of the predetermined condition, detecting a type of each of said one or more devices connected to said network;

a step of determining whether an automatic connection setting style specific to the detected type or types of said one or more devices is included in said automatic connection setting styles; and a setting step of, when it is determined that the specific automatic connection setting style is included in said automatic connection setting styles, preparing one or more input plugs or one or more output plugs in the computer according to the specific automatic connection setting style and automatically setting at least one logical connection between the one or more input plugs or one or more output plugs prepared in the computer and the one or more output plugs or one or more input plugs in said one or more devices on the basis of the specific automatic connection setting style, wherein the number of the one or more input plugs or the number of one or more output plugs prepared in the computer by said setting step varies from the number of logical connections set by said setting step, and wherein the number of logical connections set by said setting step varies in accordance with the specific automatic connection setting style.

2. A non-transitory computer readable storage medium as claimed in claim 1 wherein said predetermined condition is satisfied when software containing at least said connection setting program is installed in the computer.

3. A non-transitory computer readable storage medium as claimed in claim 1 wherein said predetermined condition is when a bus reset has occurred in said network, when another device has been newly connected to said network, or when device-connecting driver software is started up after the computer is turned-on.

4. A non-transitory computer readable storage medium as claimed in claim 1 wherein said wave data stream is a stream of waveform data, and the waveform data are synchronized in sampling frequency between the computer and said one or more devices, and wherein said predetermined condition is when the synchronized sampling frequency is to be changed.

5. A connection setting method for causing a computer to perform processing for setting logical connection between a computer and a device in a music system, said music system comprising the computer and one or more device that are all connected to a network, each of the computer and said one or more devices in said network being capable of organizing a plurality of wave data streams into a packet and isochronously transferring the packet to another device or the computer in said network, each of said one or more devices including at least either one or more output plugs for transmitting one or more wave data streams, or one or more input plugs for receiving one or more wave data streams, the input plugs or output plugs being different in number between the devices, said connection setting method comprising:

a step of reading a plurality of automatic connection setting styles prestored in a memory in advance;

a step of detecting a predetermined condition for performing automatic setting of logical connection;

a step of, in response to detection of the predetermined condition, detecting a type of each of said one or more devices connected to said network;

a step of determining whether an automatic connection setting style specific to the detected type or types of said one or more devices is included in said automatic connection setting styles; and a setting step of, when it is determined that the specific automatic connection setting style is included in said automatic connection setting styles, preparing one or more input plugs or one or more output plugs in the computer according to the specific automatic connection setting style and automatically setting at least one logical connection between the one or more input plugs or one or more output plugs prepared in the computer and the one or more output plugs or one or more input plugs in said one or more devices on the basis of the specific automatic connection setting style, wherein the number of the one or more input plugs or the number of one or more output plugs prepared in the computer by said setting step varies from the number of logical connections set by said setting step, and wherein the number of logical connections set by said setting step varies in accordance with the specific automatic connection setting style.

6. A connection setting apparatus for setting logical connection between a computer and a device in a music system, said music system comprising the computer and one or more devices that are all connected to a network, each of the computer and said one or more devices in said network being capable of organizing a plurality of wave data streams into a packet and isochronously transferring the packet to another device or the computer in said network, each of said one or more devices including at least either one or more output plugs for transmitting one or more wave data streams, or one or more input plugs for receiving one or more wave data streams, the input plugs or output plugs being different in number between the devices, said connection setting apparatus comprising:

a storage section that stores a plurality of automatic connection setting styles in advance;

a first detection section that detects a predetermined condition for performing automatic setting of logical connection;

a second detection section that, in response to detection of the predetermined condition, detects a type of each of said one or more devices connected to said network;

a determination section that determines whether an automatic connection setting style specific to the detected type or types of said one or more devices is included in said automatic connection setting styles; and a setting section that, when it is determined that the specific automatic connection setting style is included in said automatic connection setting styles, and in response to detection of the predetermined condition, prepares one or more input plugs or one or more output plugs in the computer according to the specific automatic connection setting style and automatically sets at least one logical connection between the one or more input plugs or one or more output plugs prepared in the computer and the one or more output plugs or one or more input plugs in said one or more devices on the basis of the specific automatic connection setting style, wherein the number of the one or more input plugs or the number of one or more output plugs prepared by said setting section varies from the number of logical connections set by said setting section, and wherein the number of logical connections set by said setting section varies in accordance with the specific automatic connection setting style.

7. A non-transitory computer readable storage medium as claimed in claim 1, wherein the number of input plugs or output plugs included in said one or more devices is fixed.

8. A non-transitory computer readable storage medium as claimed in claim 1, wherein said method further comprises a step of determining whether log information storing last setting of the logical connection is present, and wherein, when the log information is present, said setting step is not performed and the computer prioritizes the last setting of the logical connection stored in said log information.

9. A non-transitory computer readable storage medium as claimed in claim 1 wherein said music system includes a memory for storing the logical connection between said devices set by said setting step, and wherein said setting step automatically sets the logical connection on condition that no logical connection between the computer and said one or more devices is currently stored in said memory.

* * * * *